United States Patent [19]

Fuller, Jr.

[11] 4,417,405

[45] Nov. 29, 1983

[54] ARTICLE OF MANUFACTURE AND PROCESS

[75] Inventor: John F. Fuller, Jr., Verona, Pa.

[73] Assignee: H. J. Heinz Company, Pittsburgh, Pa.

[21] Appl. No.: 180,470

[22] Filed: Aug. 22, 1980

[51] Int. Cl.³ .............................................. F26B 3/24
[52] U.S. Cl. .......................................... 34/39; 34/41;
34/120; 99/462; 426/457; 426/616; 426/640
[58] Field of Search ............... 426/471, 473, 272, 457,
426/616, 640; 34/39, 40, 41, 120; 99/466, 483,
517, 462; 159/11 R, 12, 49

[56] References Cited

U.S. PATENT DOCUMENTS

| | | | |
|---|---|---|---|
| 1,908,489 | 5/1933 | Sartakoff . | |
| 2,118,405 | 5/1938 | Karas | 99/100 |
| 2,123,134 | 7/1938 | Cowgill | 99/204 |
| 2,140,788 | 12/1938 | Cowgill | 99/199 |
| 2,379,068 | 6/1945 | Derby | 99/206 |
| 3,006,773 | 10/1961 | Fitzgerald | 99/134 |
| 3,009,815 | 11/1961 | Lorant et al. | 99/204 |
| 3,116,124 | 12/1963 | Eolkin | 34/122 |
| 3,147,173 | 9/1964 | Eolkin et al. | 159/12 |
| 3,197,312 | 7/1965 | Eolkin | 99/204 |
| 3,235,391 | 2/1966 | Dorsey | 99/204 |
| 3,259,508 | 7/1966 | Aguirre et al. | 99/204 |
| 3,506,447 | 4/1970 | Billerbeck et al. | 426/640 |
| 3,592,667 | 7/1971 | Kelly et al. | 99/199 |
| 3,879,568 | 4/1975 | Luh et al. | 426/541 |
| 3,969,539 | 7/1976 | Sumner | 426/471 |
| 3,974,301 | 8/1976 | Luh et al. | 426/640 |
| 4,006,254 | 2/1977 | Gralak | 426/640 |
| 4,268,247 | 5/1981 | Freze | 34/15 |

OTHER PUBLICATIONS

Fanny Farmer Cookbook, Little Brown and Company, Boston, Mass. 1955, p. 516.

Lazar, M. E. and Morgan, A. I., Jr. "Instant Applesauce" Food Technology, Apr. 1966, pp. 197-181.

Hardinge, M. G., Swarner, J. B. and Crooks, H. "Carbohydrates in Foods" Journal of The American Dietetic Assoc. vol. 46, p. 197.

Johnson, G., Johnson, D. K. and Kob, K. "Fresh-Flavored Instant Applesauce Powder" Food Technology, vol. 18 (8), p. 127.

Lopez, A., 1969 "A Complete Course in Canning" The Canning Trade p. 252.

Makower, B. and Dye, W. B., 1956 "Equilibrium Moisture Content and Crystallization of Amorphous Sucrose and Glucose" Journal of Agriculture and Food Chemistry, vol. 4 (1), p. 72.

Nelson, D. B., Smit, C. J. B. and Wiles, R. R., 1967 "Commercially Important Pectic Substances" Food Colloids, p. 418.

Notter, G. K., Brekke, J. R. and Taylor, D. J., 1959 "Factors Affecting Behavior of Fruit and Vegetable Juices During Vacuum Puff-Drying" Food Technology, vol. 13 (6), p. 341.

Turkot, V. A., Eskew, R. K. and Accto, N. C., 1956 "A Continuous Process for Dehydrating Fruit Juices" Food Technology, vol. 10 (12) p. 60.

Primary Examiner—Larry I. Schwartz
Attorney, Agent, or Firm—Paul & Paul

[57] ABSTRACT

An article of manufacture and process for making same are provided wherein fresh fruit or mixtures thereof is made into a puree by heating, pulping and finishing same in a manner which preserves the fruit's natural integrity, and then the pulped and finished puree is drum dried, flaked and packaged under controlled atmospheric conditions to produce a free flowing flaked fruit product which is readily reconstitutable, and does not contain any binders, gelling agents, fillers, extenders, or other undesirable additives.

28 Claims, 2 Drawing Figures

ARTICLE OF MANUFACTURE AND PROCESS

BACKGROUND OF THE INVENTION

The present invention is directed to a novel article of manufacture made from natural fruits and a process for its manufacture. More particularly, a novel, readily reconstitutable, free flowing flaked product is produced by a novel and synergistic dehydration drying process.

The product of this invention is natural dried fruit flakes which are free from extenders, binders, and other additives heretofore thought to be required in producing same when utilizing a continuous dehydration process.

This invention also has application to the production of other products and processes into which the dried fruit product hereof and the process for making same may be incorporated, such as fruit flavored cereals and the like.

When referring to the flaked product of the present invention, it will be recognized that the term "flakes" encompasses a free flowing solid material having an exceptionally low moisture content which can readily be spooned from a jar or other container, is not prone to lumping in a sealed container, and readily becomes free flowing with agitation or stirring even after the container is initially opened to atmosphere. No specific particle size is implied by the term "flake", however, the process of this invention permits flakes to have a large particle size without sacrificing the foregoing properties. The term "reconstitutable" as used herein relates to mixing the flaked fruit product with a liquid of various temperatures ranging from hot to cold, including various liquids such as, e.g., milk or water, to form a reconstituted product. The term "readily reconstitutable" is meant to include a virtually instantaneously reconstitutable product of varying viscosities, as desired; additionally, one in which the viscosity may be adjusted even after the product has been initially reconstituted.

Fresh fruit products such as applesauce and the like typically contain large percentages of water. This high water content places a heavy burden on the packaging, handling, storing and shipping of such products and has thus stimulated the development of many processes for the dehydration of fruit products. These processes, however, have not as yet satisfied the need for a natural dried fruit product since the present state of the art indicates that natural fruit concentrates and purees cannot be commercially dried in a continuous manner to form a readily reconstitable free flowing flaked fruit product which is free from unwanted additives.

The conventional manner of forming a flaked product is to drum dry a concentrate into a continuous sheet which is then flaked. The present state of the art requires, however, the addition to the concentrate of extenders, binders, gels, gums, and other additives to achieve the formation and removal of a continuous sheet of product from the drum dryer. One of the inherent disadvantages of such processes is that the additives remain in the final product and therefore, the product is undesirable as a natural food. For example, the additives are in most cases either inorganic substances, or carbohydrates or proteinaceous materials, which deleteriously affect the reconstitution properties of the product, or dilute the product's flavor, desired nutritional value, consummer acceptability, or the like. Moreover, many of the prior art processes, while claiming to produce a satisfactory product, generally treat the puree in such a manner which destroys the cellular structure of the natural fruit, either mechanically, thermally or chemically, and thus does not retain the naturally occurring constituents or integrity of the fruit. It will be understood that the term "extenders" as used herein encompasses any additive made to the puree for purposes of forming a sheet on a dryer, releasing the puree from the surface of a dryer, or otherwise permitting the natural fruit puree to be continuously drum dried and may, for example, include binders, gels, gums, polysaccharides, and extenders as may be known and utilized in this art.

The prior art processes therefore do not produce a natural fruit product, which reconstitutes to a fresh fruit food which does not have added starches, saccharides, binders, extenders, or other additives, while at the same time preserving the natural constituents of the fruit and therefore its nutritional value, taste, and the like.

SUMMARY OF THE INVENTION

It is therefore an object of the present invention to cure the aforementioned disadvantages of the prior art.

Another object is to provide a novel process which produces a novel free flowing readily reconstitutable flaked fruit product.

These objects and others will be apparent to one skilled in the art from a thorough reading of this specification, the drawing figures, examples and appended claims.

These objects are accomplished by a process which comprises making a fruit puree and pulping and finishing same all in a manner which retains the natural integrity of the fruit. The finished puree is dried in a special conditioning environment under controlled atmospheric conditions. Thereafter the dried product is further processed by flaking and packaging same within the same conditioning environment. More particularly, it has been discovered that the above pulped and finished puree, when drum dried under controlled atmospheric conditions permits the finished puree to synergistically react with the drum drying surfaces and environment forming continuous films and/or sheets which are subsequently doctored from the drum dryer and processed as set forth above.

The fruit product thus manufactured has a moisture content of less than about 1.0%, is free flowing, is readily reconstitutable, and is free from binders, extenders, and other undesirable additives.

THE DRAWING FIGURES

DETAILED DESCRIPTION OF THE PREFERRED EMBODIMENT

Figure 1:
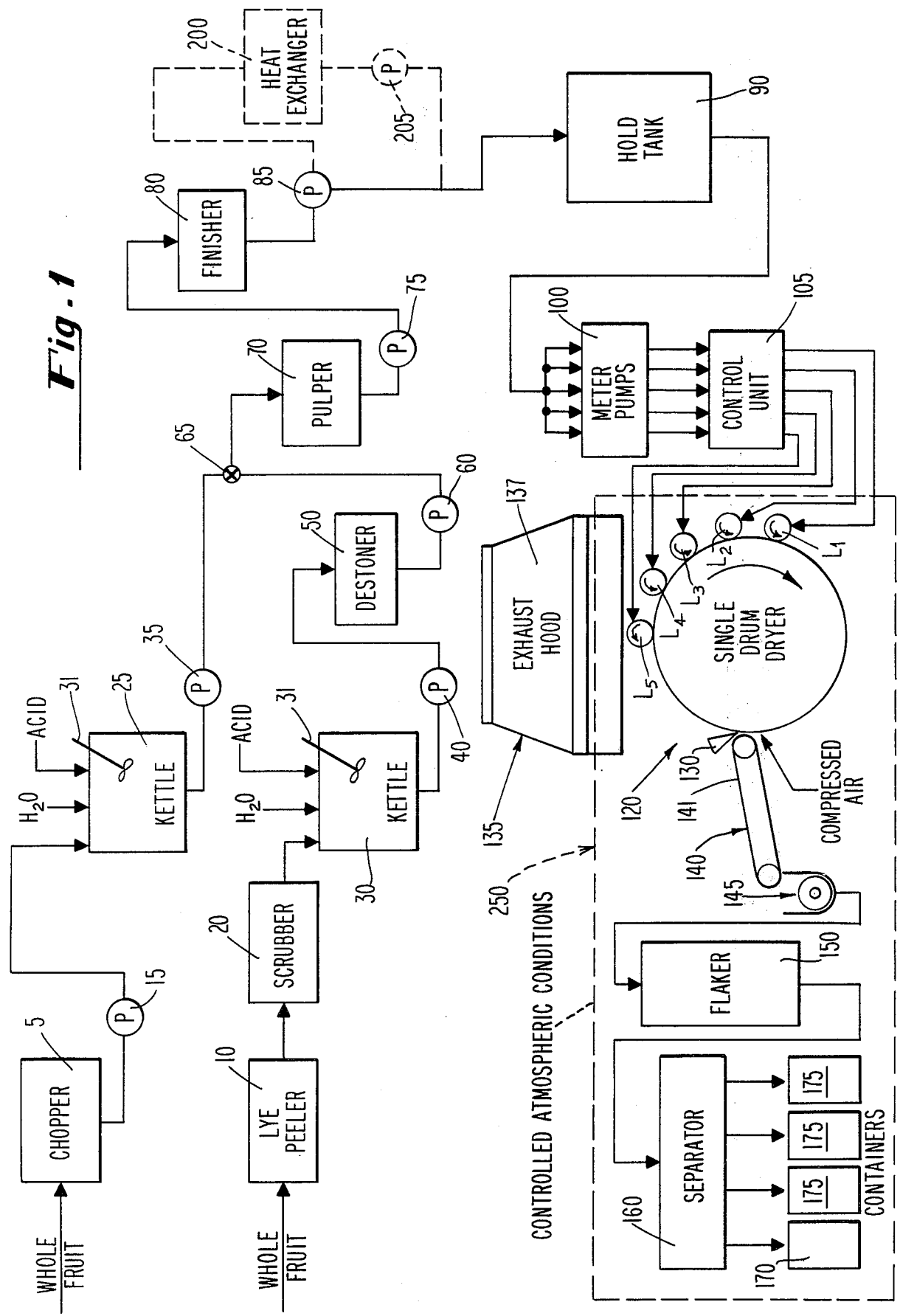
FIG. 1, is a block flow diagram depicting the preferred process of the present invention.

Referring now to FIG. 1, it will be understood that preparatory to the processing as depicted, the fresh fruit, which may be apples, pears, bananas, peaches, plums and the like, is washed and sorted with only the select fruit being passed on for further processing. The fruit utilized in the present invention is ripe or mature fruit which may or may not contain pits, stones, and the like. If the fruit contains pits or stones it is first peeled, such as for example by a lye peeler, block 10, and then washed and scrubbed by a scrubber as is known in the art, block 20. The peeled fruit is then conveyed to cook kettle 30 after which it is pumped by food pump 40 to a destoner 50 which removes the pits or stones prior to the resultant product being pumped by food pump 60 through valve 65 to pulper 70.

In the case of fruits not having pits or stones, a second process line is utilized wherein the selected fruit is conveyed to chopper 5 which dices the fruit into cubes of between about ¼ to ½ inches. The diced product includes, in the case of apples and pears, cores and seeds. When bananas are to be processed, whole peeled bananas, which in the preferred embodiment are fresh frozen, are conveyed to chopper 5 where they are processed in the same manner as described, above, and pumped by food pump 15 to cook kettle 25 and thereafter pumped by food pump 35 through valve 65 to pulper 70. It will be understood that valve 65 ensures the product is pumped by either pump 35 or pump 60 to pulper 70 and not into the line not in operation.

In the process as thus far described, prior to the product entering cook kettles 25 and 30, which are both open stainless steel kettles having steam jackets to which pressurized steam may be supplied for heating purposes, 25 gallons of filtered water and, in the preferred embodiment, small quantities of organic anti-oxidants and/or ascorbic acid are added to kettles 25 and 30 and brought to a boil. The amount of water selected is based upon the type of fruit processed and the batch weight of fruit, but generally is about one pound of filtered water to every 7.5 pounds of fresh fruit. The amount of anti-oxidant used is about 0.05 to 0.30 percent based upon raw food weight (wet batch). In the preferred embodiment about 13 ounces of ascorbic acid (vitamin-C) and about 6 ounces of citric acid are added to the 25 gallons of water for fortification and to retard or prevent discloration of the fruit. The fruit product is then added to the boiling water containing the organic acids and then heated with agitation or stirring by mixers 31, to soften the fruit. This is accomplished at the minimum permissible temperatures which destroys certain microorganisms and/or creates an environment which will not support microbial growth, as is known in the art in view of the nature of the novel product of the present invention which has a moisture content of less than 1.0% and a water activity $A_w$ of less than 0.65.

While applicant does not wish to be limited to any particular theoretical concept, it is believed that the foregoing type heating preserves the natural constituents of the fruit without the reduction or alteration of the carbohydrates and more commonly the various saccharides which may for example, depending upon the fruit, include: monosaccharides such as fructose or glucose; disaccharides such as lactose, maltose, and sucrose; reducing sugars; and polysaccharides such as cellulose, dextrins, hemicellulose, pectin, pentosans, and starch. The retention of these carbohydrate constituents is herein referred to as the "integrity" of the fruit. If excessive heat is utilized, some of the natural di- and poly-saccharides are reduced to simple sugars. The resultant increase in these sugars is believed to be one of the factors causing difficulties in drum drying a natural fruit puree.

The above heated puree is pumped through pulpers 70, which comprise screens having openings for removing seeds and skins, which openings are preferably about 0.060 inches, and then pumped by food pump 75 to finisher 80 which in the preferred embodiment is a pair of finishers having screens with openings in the neighborhood of preferably about 0.023 inches. The pulper and finisher screens may be varied in size as is known in the art to remove undesirable material from particular fruits to be processed. The fruit thus processed, herein referred to as the "finished puree", should have its natural integrity preserved with its constituent elements evenly dispersed throughout the finished puree. The finished puree is then pumped into covered hold tank 90 by food pump 85 and thereafter by meter pumps 100 (metering food pumps) onto drum dryer 120.

In the instance the finished puree will not be drum dried within a two to four hour period it is then preferably pumped to tubular heat exchanger 200 where the puree is cooled to less than 100° F. which protects it from discoloration. The resultant puree may be quick frozen and stored and then subsequently thawed and repumped through finisher 80 and thereafter drum dried, or may be held at temperatures less than 100° F. for several hours in hold tank 90 and thereafter drum dried. Food pump 205 is provided for pumping the puree from heat exchanger 200 to hold tank 90.

Figure 2:
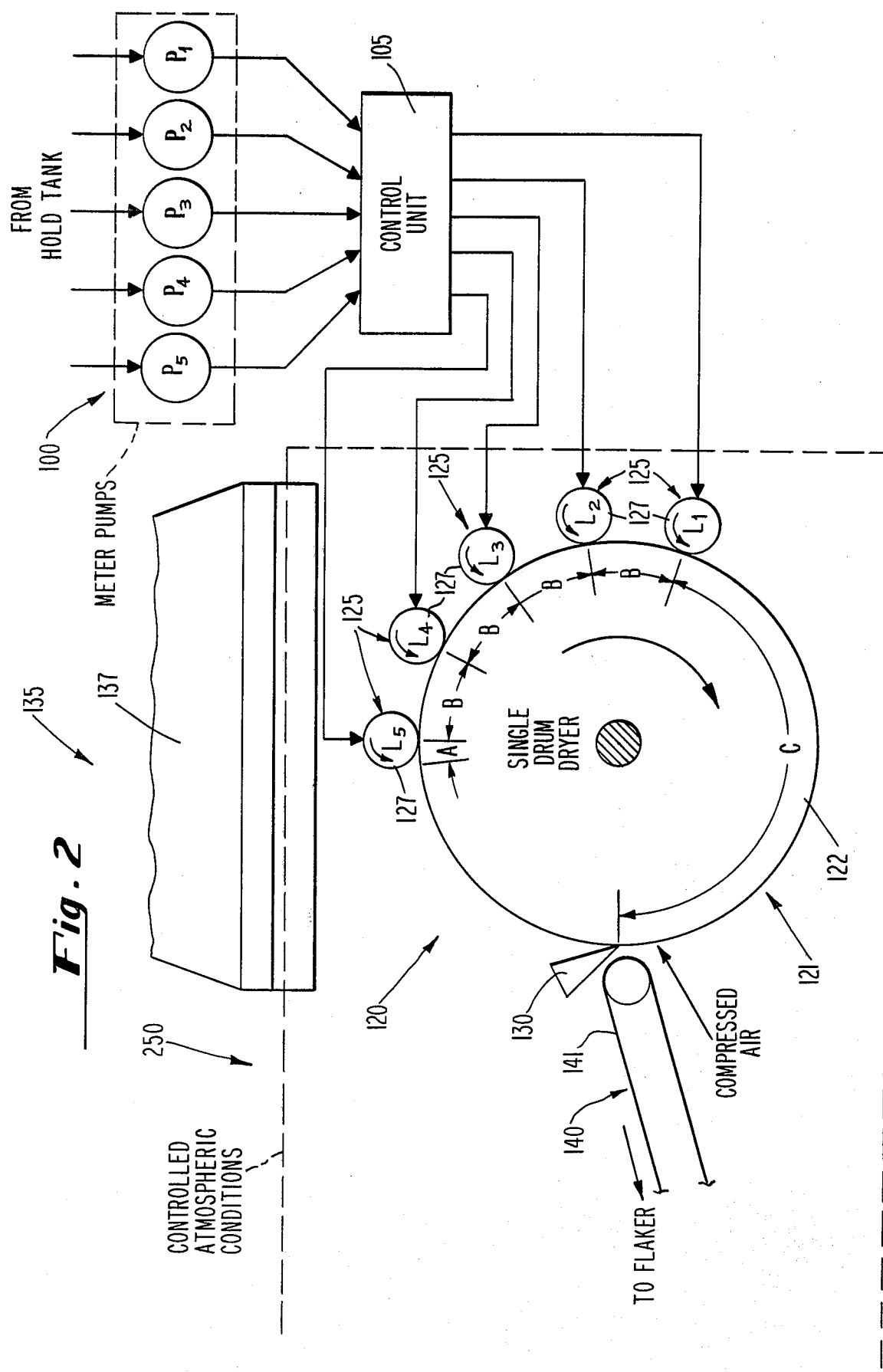
FIG. 2, is an enlarged view of a portion of the process as depicted in FIG. 1.

Referring now to both FIG. 1 and FIG. 2, it can be seen that drum dryer 120, conveyor 140, screw conveyor 145, flaker 150, separator 160 and foil-lined fiber drums 170 and 175 are all contained within controlled atmospheric conditions in carefully controlled environment 250. Environment 250 is maintained by an air conditioning system which is a silica gel type air conditioner rated at 10,000 cfm for conditioning air at 95° F. dry bulb, 78° F. wet bulb, to 50° F. with a relative humidity of a maximum of 30%. In the preferred embodiment drum dryer 120 is placed in close proximity with and underneath exhaust hood 137, which is the sole return for the air conditioning system. Exhaust system 135 is in the preferred embodiment set to maintain a positive pressure in environment 250 by evacuating a lower volume of air than is being pumped into environment 250 by the air conditioner. The positive pressure prevents air which is outside environment 250 from being drawn into the environment and therefore helps to stabilize the controlled atmospheric conditions. The entire system is designed to maintain the environment at temperatures of less than 70° F. and at a relative humidity of less than 30% under conditions in which drum dryer 120 is operating at its maximum capacity. It has been found that as the temperature drops below 70° F., higher relative humidities of up to about 50% can be successfully utilized depending upon the nature of the finished puree (its temperature, composition, and the like), the surface temperature of drum dryer 120 and spreader rollers 125, and the operating parameters of the air conditioning system and exhaust system 135 (i.e., cfm). The exhaust system 135 circulates the conditioned air within environment 250 in a manner which evacuates and causes a continuous circulation of the air within the vicinity of drum dryer 120. This condition is herein referred to as "immersing" or "bathing" the apparatus, puree, or product in a "flow of air" or "air flow".

Meter pumps 100 comprise five individual pumps $P_1$, $P_2$, $P_3$, $P_4$, and $P_5$, each of which is individually controlled by electronic controller 105 to operate from 0 to 6 gal./min. Meter pumps 100 constitute a positive displacement pumping station as is known in the art and feed the distribution/spreader rollers designated generally by numeral 125. Distribution/spreader rollers 125 each have a distributor spreader bar (not shown) for application of the finished puree to the drum surfaces as described below. Pumps $P_1$, $P_2$, $P_3$, $P_4$, and $P_5$ operate in conjunction with spreader rollers $L_1$, $L_2$, $L_3$, $L_4$, and $L_5$, respectively.

Drum dryer 120 as is more clearly depicted in FIG. 2, is a single drum type dryer as is known in the art which has a 5 foot diameter. In operation, meter pumps 100 each pump predetermined amounts of product through the distributor bars each having a reciprocating product feeder which evenly deposits the finished puree either onto the 8 foot length of drum surface 122 in close proximity to spreader rollers 125 and more particularly in the nip formed by drum dryer 120 and spreader rollers 125, or directly onto spreader rollers 125. Spreader rollers 125 are 8 feet long, 10 inches in diameter and have individual settings to control their rotational speed and distance from drum surface 122. In the drawing figures, spreader rollers 125 rotate in counter-clockwise direction whereas drum 121 rotates in clockwise direction. Controllers (not shown) can be set to regulate the rotation of drum 121 at from 2 to 11 rpm and rollers 125 at from 11.4 to 62.7 rpm. Drum dryer 120 may operate with any one or more of spreader rollers 125 functioning in whole or in part. The product feeder of spreader rollers 125 may be made inoperational by setting controller 105 of the corresponding meter pump 100 to 0 gal./min. Additionally, spreader rollers 125 may be set far enough from drum surface 121 to be out of contact with any puree being distributed on drum surface 122, or may operate solely as a press roller to regulate the thickness of the product being distributed and/or rolled upstream; e.g., if product feeder for distribution/spreader roller $L_5$ was distributing puree in its corresponding nip, pumps $P_4$, $P_3$, $P_2$, and $P_1$ could be set at 0 gal./min. and spreader rollers $L_4$, $L_3$, $L_2$, and $L_1$, or any combination, could be adjusted to function solely as press rollers. Moreover, spreader rollers 125 contain water jackets interiorly of roller surface 127 which may be supplied with a fluid which may be refrigerated or otherwise.

In the preferred embodiment: drum 121 rotates clockwise at 3.0 rpm; spreader roller $L_5$ is set at 0.070″ nip (the shortest distance from drum surface 122 to spreader roller 125) at 5° clockwise from twelve o'clock on drum 121 to nip $L_5$ (FIG. 2); rollers $L_4$, $L_3$, and $L_2$ rotate counterclockwise at 17.1 rpm; pumps $P_4$, $P_3$, and $P_2$ are set at from 2.5 to 3.75 gal./min.; $P_1$ is set at 0 gal./min.; $L_1$ operates as a press roller also at 17.1 rpm and at about from 0.035″ to 0.060″ nip; rollers $L_4$, $L_3$, and $L_2$ are set at from about 0.055″ to 0.070″ nip; the $L_4$ product feeder meters puree into it's respective nip and the $L_3$ and $L_2$ product feeders meter puree onto corresponding spreader roller surface 137 at the 11:00 o'clock position; and spreader rollers 125 are positioned so their respective nips are 25° apart as measured on drum 121. In this fashion, the finished pulp which has a moisture content in the range of abo8ut 85% to 90% and is generally at a temperature of from about 100° F. to 180° F. is deposited on drum dryer surface 122.

Drum dryer 120 has means (not shown) for supplying pressurized steam interiorly of drum surface 122 for purposes of heating drum surface 122. In the preferred embodiment pressurized steam in the range of from about 80–96 p.s.i.g. (325° F. to 335° F.) is fed into drum dryer 120 to heat dryer surface 122. The pressurized steam supply and drum dryer 120 form a closed system in that none of the steam utilized to heat drum surface 122 is released to controlled environment 250. The entire chrome plated drum surface 122 is heated uniformly throughout and may be heated to any desired temperature by adjusting the pressure of the steam as is known in the art.

In operation of drum dryer 120 as thus far described, controlled environment 250 is which drum dryer 120 is contained, is in the preferred embodiment, maintained within the aforementioned controlled atmospheric conditions. Exhaust system 135 has an exhaust hood 137 which extends into controlled environment 250, in close proximity to drum 121 and spreader rollers 125, and is set to evacuate the air as set forth above. Under these conditions the finished puree of the present invention is evenly distributed to the nips formed at spreader rollers $L_4$, $L_3$ and $L_2$ in amounts which only allow the puree to reside in puddles at the nip for a very short time. As used herein "puddles" are created when the amount of puree deposited to the nip exceeds the amount being withdrawn from the nip by the rotation of the dryer drum 121 and rollers 125. When drum dryer 120 is in continuous operation, a film of puree is applied to drum surface 122 at $L_4$ and acted upon by heated drum surface 122 for a predetermined amount of time under controlled atmospheric conditions between rollers $L_4$ and $L_3$, then a second film is deposited on the first film at $L_3$ and acted upon as above between rollers $L_3$ and $L_2$, a third film is deposited on the second film at $L_2$ and acted upon as above between rollers $L_2$ and $L_1$ and then press rolled by roller $L_1$. It will also be understood that initial film formation could take place at $L_5$ by causing sufficient puddle buildup at $L_4$ to enable spreader roller $L_5$ to contact the builtup puddle. Spreader roller $L_1$ operates to press the above composite films the outer surface of which is generally frost-white in appearance. This composite is thereafter further conditioned on drum dryer 120 under controlled atmospheric conditions until it is doctored from drum surface 122 by doctor blade 130. During this continuous film forming operation, the above films and ultimately the uniform sheet are substantially isolated from the moisture evolved in the drying operation by a combination of mechanisms occurring substantially simultaneously. Exhaust system 135 operates to withdraw the moisture and steam evolved during the formation and curing of the films, by evacuating the evolved steam and moisture from drum surface 122, distribution/spreader rollers 125 (including the distributor bars), and from the puree, the formed films, and the subsequently formed sheet. Concomitant with the withdrawal of the above moisture is the evacuation of the conditioned air within controlled environment 250 and the concomitant cooling, dehumidification, drying, and immersion of the apparatus, fruit puree, films, and sheet within a cooling-dehumidified flow of air.

Without limiting the scope of the present invention it is believed that the puree synergistically reacts with drum dryer 120 within the controlled atmospheric conditions as described above, to form a novel drum dried sheet which is further processed into the flaked product of the present invention as is more fully set forth below. Most preferably, two or more films are formed and cured on drum dryer 120, forming a composite film which is press rolled and cured to produce the novel dried sheet. It is comtemplated however, that a single film as well as a plurality of films may be utilized to produce the product of the present invention.

In the preferred embodiment a source of filtered compressed air may optionally be blown onto the dried sheet just prior to it being doctored from drum surface 122. The compressed air aids in the doctoring of the sheet. It will be understood that in the preferred embodiment exhaust system 135 of the air conditioning system operating within controlled environment 250 likewise causes the circulation of conditioned air in the proximity of and upon doctor blade 130. Doctor blade 130 is constructed as is known in the art to remove the entire sheet from drum 121 without scratching or otherwise damaging drum surface 122. After being doctored, cleaned drum surface 122 is further dried by the heat within drum dryer 120 in conjunction with the controlled atmospheric conditions as set forth above. Drum surface 122 is thus cleaned and dried in the controlled atmospheric conditions from the point at which doctor blade 130 removes the sheet until the puree is again applied to drum surface 122 by distribution/spreader roller $L_4$.

The novel dried continuous sheet is directed to conveyor 140 by doctor blade 130. The term "dried" or "dehydrated" as used herein with respect to the sheet indicates that the sheet is one in which the surfaces are not wet or tacky. Conveyor 140 which is a conventional endless belt conveyor, conveys the continuous dried sheet to screw conveyor 145. It will be understood that a continuous sheet is formed and is continuously conveyed by conveyor 140 from drum dryer 120 at a speed equal to that of the doctored sheet. Belt 141 of conveyor 140 has a width slightly larger than the 8 foot width of the dried sheet and may be perforate or otherwise open to atmosphere so that the dried sheet is entirely exposed to the controlled atmospheric conditions. The conveyed sheet is thereafter deposited in screw conveyor 145 which breaks up the sheet and conveys it under controlled atmospheric conditions to flaker 150. In the preferred embodiment the dried sheet takes about from 15 to 30 seconds to travel from doctor blade 130 to screw conveyor 145 and another 30 to 45 seconds to travel from screw conveyor 145 to flaker 150.

In the preferred embodiment, flaker 150 is set to produce as large a particle size flake as possible, suitable of course to its end use, and is preferably passed through flaking screens (not shown) of from about $\frac{1}{4}$ to $\frac{1}{2}$ inches, as is known in the art. The flaked product is then pneumatically pumped to separator 160 which is a conventional, screened, shaker type separator wherein the larger and heavier undesirable flakes are removed and deposited into container 170. Separator 160 deposits the desired flaked product into containers 175 where the product is packaged in 55 gallon foil-lined drums. The entire processing of the finished puree, from its application onto drum dryer 120 through packaging in containers 175 is under controlled atmospheric conditions. In the preferred embodiment, the processing from after the sheet is doctored from drum surface 122 until it is packaged in containers 175 takes from about 2.0 to 5.0 minutes. If it is desired to repackage the product it is preferable that the above drums be transported and repacked under controlled conditions.

As can be seen from the Examples, below, the flaked product produced under conditions where the relative humidities were less than 30% contained remarkably low levels of moisture in the range of from om about 0 to 0.50% and certainly less than 1.0%. The product of this invention therefore has an $A_w$ value of less than 0.65 which prohibits the growth of spore formers and microorganisms. The novel dried sheet of the present invention when flaked and packaged as above, does not lump in the package and is readily reconstitutable whereas pilot studies have indicated that wet or tacky sheets (greater than 2.0% moisture content) lump when flaked and packaged as above.

To further illustrate the invention, the following examples are provided. It should be understood that the particular details of the examples are not to be regarded as limitations, as they may be varied as will be understood by one skilled in the art.

EXAMPLE I 1125 pounds of mature washed and sorted fresh Golden Delicious apples and 375 pounds of mature washed and sorted red apples were diced into $\frac{1}{2}$ inch cubes and added to an open kettle having 25 gallons of boiling filtered water, into which 13 ounces of ascorbic acid and 6 ounces of citric acid were previously added. Under mild agitation with a Warhead mixer, the apples were heated to 200° F., pumped through a pulper set at 0.060" and then through two successive finishers each set at 0.023". The finished puree was then pumped to a covered holding tank which feeds the positive displacement pumping station having five pumps. Pump $P_5$ was not operated. Pumps $P_4$, $P_3$, and $P_2$ were set at 2.5 gal./min., 2.75 gal./min., and 2.5 gal./min., respectively. The drum dryer was steam heated at 96 p.s.i.g. and rotated at 3.0 rpm. Spreader rollers $L_5$, $L_4$, $L_3$, $L_2$, and $L_1$ were set at 0.070, 0.065, 0.065, 0.055 and 0.055 inches nip respectively, rotated at 17.1 rpm, and were set with angles A and B at 5° and 25°, respectively. The air conditioning system was operated to provide controlled atmospheric conditions as set forth above, at a temperature and humidity of 62° F. and 35%, respectively. A continuous dried sheet was produced doctored from drum at angle C at 200° and subsequently flaked at a screen setting of $\frac{1}{4}$". The moisture content of the resultant flakes was measured by the vacuum oven method (Association of Official Analytical Chemists, 1980, 3d. Ed. Method 16.233), from samples taken three weeks after the flakes were produced and packaged in containers 175. The moisture content of the flakes was found to be 0.15%.

EXAMPLES II THROUGH IV

The puree was processed and dried as in Example I under the following temperatures and relative humidities yielding the following results three weeks after packaging:

| Example | Temperature °F. | Relative Humidity % | Average Flake Moisture Content % |
|---|---|---|---|
| II | 63 | 50 | 0.37 |
| III | 62 | 15 | 0.05 |
| IV | 66 | 44 | 0.56 |

EXAMPLES V-VIII 750 pounds of mature fresh frozen peeled bananas, 625 pounds of mature washed and sorted Golden Delicious apples and 200 pounds of mature washed and sorted red apples were diced into $\frac{1}{2}$ inch cubes and added to an open kettle, heated to 190° F. and processed as in Example I. The puree was processed under the following temperatures and humidities yielding the following results three weeks after packaging:

| Example | Temperature °F. | Relative Humidity % | Average Flake Moisture Content % |
|---|---|---|---|
| V | 82 | 19 | .13 |
| VI | 74 | 20 | .29 |
| VII | 68 | 41 | .31 |
| VIII | 70 | 25 | .36 |

EXAMPLES IX–XII 465 pounds of mature fresh frozen bananas, 365 pounds of mature washed and sorted Golden Delicious apples and 120 pounds of mature washed and sorted red apples were diced into ½″ cubes and added to an open kettle together with 42 pounds of peach paste (100% solids) and heated to 200° F. The puree was processed as in Example I, under the following temperatures and relative humidities yielding the following results three weeks after packaging:

| Example | Temperature °F. | Relative Humidity % | Average Flake Moisture Content % |
|---|---|---|---|
| IX | 80 | 21 | .41 |
| X | 76 | 15 | .24 |
| XI | 74 | 16 | .06 |
| XII | 74 | 23 | .07 |

As is clear from the foregoing, the sheet of the present invention can be obtained under various conditions within the scope of the present invention, e.g., depending upon the nature of the puree, the surface temperature and rpm of drum dryer 120 and the parameters affecting the controlled atmospheric conditions as set forth above, and the like. Moreover, while it is most preferable for the environment to be maintained at or below 70° F. and at a low relative humidity (given the above controlled atmospheric conditions), Examples V and IX indicate that temperatures of about 80° F. are acceptable with low relative humidities of about 20%. An acceptable product was also produced at relative humidities of greater than 30%, See Examples I, II, IV, and VII.

The present invention, its modus operandi, and many of the advantages attendant thereto should be readily understood from the foregoing without further description. While the preferred embodiments and examples of the present invention have been shown and described for illustrative purposes, it is nevertheless capable of variation within the purview of the invention as defined by the appended claims.

What is claimed is:

1. The process for drum drying a fruit puree on a drum dryer, which comprises the steps of:
   (a) applying said fruit puree at a rate of at least about 1.2 gal/ft² hr to said drum dryer forming a film in a controlled environment of cooling-dehumidified air;
   (b) drum drying said puree in said controlled environment of cooling-dehumidified air to form a drum dried product; and
   (c) flaking said drum dried product whereby the resultant flaked product has a moisture content of not more than about 1% and said flaked product is readily reconstitutible to natural consistency.

2. The process as in claim 1, wherein said puree is prepared from mature fruit using the steps of:
   (a) cooking by heating said fruit to a temperature to soften said fruit and in a manner which retains the integrity of said fruit;
   (b) screening said fruit to remove undesirable material in a manner which preserves its integrity; and
   (c) delivering said screened fruit to said drum dryer for drying.

3. The process as in claim 2, wherein said fruit is heated to a temperature of between about 190° F. and 200° F. prior to said screening step.

4. The process as in claim 1, wherein said puree, when dried, forms a sheet on the drum of said drum dryer which is doctored from said drum dryer; further comprising the step of drying said doctored drum in said controlled atmospheric environment of cooling-dehumified air prior to applying said fruit puree on said drum dryer.

5. The process as in claim 1, wherein step (a) is performed to form a first film, further comprising the step of forming a second film by applying said puree to said first film after said first film has remained in said controlled environment for a predetermined period of time.

6. The process as in claim 5, further comprising the step of press rolling the combined said first and second films in said controlled environment.

7. The process as in claim 1 wherein fresh fruit is utilized in said puree, which puree is prepared without the addition of extenders.

8. The process as in claim 7, further comprising the step of preparing said fresh fruit puree in a manner which preserves the natural integrity of the fruit.

9. The process as in claim 1, further comprising the step of evacuating the air from said controlled atmospheric environment.

10. The process as in claim 1, wherein said flaking step further comprises the steps of removing said puree from said drum dryer in a sheet and flaking said sheet, said removing and flaking steps, being conducted entirely within said controlled environment.

11. The process as in claim 10, further comprising the step of conveying said sheet in said controlled atmospheric environment prior to said flaking of said sheet.

12. The process as in claim 10, further comprising the step of breaking up said dried sheet in said controlled atmospheric environment prior to said flaking of said sheet.

13. The process as in claim 1, further comprising the steps of supplying said environment with said cooling-dehumidified air, and evacuating the air from said environment at a rate which is less than the rate said cooling-dehumidified air is supplied, whereby a positive pressure is maintained to prevent non-controlled air from outside said controlled environment from flowing into said controlled environment.

14. The process as in claim 13, wherein the evacuation of said air is performed in close proximity to said drum dryer.

15. The process as in claim 1, wherein said cooling-dehumidified air has a relative humidity of less than about 60% and a temperature of less than about 80° F.

16. The process as in claim 1, wherein said cooling-dehumidified air has a temperature of about 70° F. or less and the sum of said temperature and relative humidity is about 120 or less.

17. The process as in claim 16, wherien said sum is about 100 or less.

18. The process as in claim 1, wherein said cooling-dehumidified air preferably has a relative humidity of less than about 30%.

19. The process for forming a sheet from a fruit puree in an environment of cooling-dehumidified air by drum drying same wherein the drum drying apparatus is a single drum type dryer having a drying drum and at least one distribution/spreader roller, wherein said drum drying operation produces steam and moisture, comprising the steps of:
(a) maintaining the condition of said air in said controlled environment;
(b) applying said puree to said drying drum via said distribution/spreader roller at a rate of at least about 1.2 gal/ft$^2$ hr forming a film;
(c) drying said puree, whereby said forming and drying steps are conducted entirely in said controlled environment of a cooling-dehumidified flow of air to form a drum dried product; and
(d) flaking said drum dried product in said controlled environment, whereby the resultant flaked product has a moisture content of not more than about 1% and said flaked product is readily reconstitutible to natural consistency.

20. The process as in claim 19, wherein said sheet is formed from a plurality of films and distribution/spreader rollers, wherein said first distribution/spreader roller is operated to form a first film on said drying drum, further comprising the step of forming a plurality of films by applying said puree to said previously formed film via at least one subsequent distributor/spreader roller.

21. The process as in claim 20, further comprising the step of press rolling the combined said plurality of films.

22. The process for forming a sheet from a non-extended fruit puree by drum drying same wherein the drum drying apparatus is contained within a controlled environment of cooling-dehumidified air and is a single drum type dryer having a drum and at least three distribution/spreader rollers, comprising the steps of:
(a) maintaining the condition of the air in said controlled atmospheric environment of cooling-dehumidified air and evacuating same from said environment in a manner which circulates a cooling-dehumidified flow of air in the vicinity of said drum dryer;
(b) applying said puree to said drum via a first distribution/spreader roller;
(c) applying said puree to the product of step (b) via a second distribution/spreader roller;
(d) applying said puree to the product of step (c) via a third distribution/spreader roller, whereby the total feed rate of said puree ranges from about 1.2 to 7.2 gal/ft$^2$ hr;
(e) press rolling the product of steps (b), (c), and (d), whereby the product of said applying steps is dried and said resultant product of said applying, drying, and press rolling steps is bathed in said cooling-dehumidified air; and
(f) flaking the resultant product of step (e) forming a flaked product having a moisture content of not more than about 1%, whereby said flaked product is readily reconstitutible to natural consistency.

23. The process of claim 22, wherein said feed rate is in the range of from about 3.6 to 5.8 gal/ft$^2$ hr.

24. The process for drum drying a fruit puree on a drum dryer which comprises the steps of:
(a) applying said fruit puree to said drum dryer at a rate of at least about 1.2 gal/ft$^2$ hr;
(b) forming a film in a controlled environment of cooling-dehumidified air wherein the sum of the temperature in degrees Fahrenheit and percentage relative humidity of said cooling-dehumidified air is less than about 100;
(c) drying said puree in said controlled environment of cooling-dehumidified air to form a sheet; and
(d) flaking said sheet whereby the resultant flaked product has a moisture content of not more than about 1% and said flaked product is readily reconstitutible to natural consistency.

25. The process as in claim 24, wherein the drying drum of said drum dryer rotates at from about 2 to 11 rpm.

26. The process as in claim 24, wherein said feed rate is in the range of from about 1.2 to 14.4 gal/ft$^2$ hr.

27. The process as in claim 24, wherein said feed rate is in the range of from about 1.2 to 7.2 gal/ft$^2$ hr.

28. The process as in claim 25, wherein said feed rate is in the range of from about 1.2 to 5.8 gal/ft$^2$ hr.

* * * * *